United States Patent [19]

Beneke et al.

[11] 4,051,933

[45] Oct. 4, 1977

[54] LOW INERTIA CLUTCH AND BRAKE SYSTEM

[75] Inventors: Jene A. Beneke, McKinney, Tex.; Tsuruo Otsuka, South Holland, Ill.; Steven R. Otsuka, Duncanville; Samuel G. Sarkisian, Dallas, both of Tex.

[73] Assignee: Verson Allsteel Press Company, Dallas, Tex.

[21] Appl. No.: 667,700

[22] Filed: Mar. 17, 1976

[51] Int. Cl.² .................. F16D 67/04; F16D 25/10
[52] U.S. Cl. .................... 192/18 A; 192/85 CA; 192/87.17
[58] Field of Search ............ 192/87.17, 18 A, 4 R, 192/85 CA, 4 R

[56] References Cited

U.S. PATENT DOCUMENTS

| 3,321,054 | 5/1967 | Johnson et al. | 192/87.15 |
| 3,561,279 | 2/1971 | Beneke | 192/4 R |
| 3,595,353 | 7/1971 | Beneke | 192/18 A |
| 3,860,100 | 1/1975 | Spanke et al. | 192/18 A |
| 3,896,911 | 7/1975 | Beneke | 192/18 A |

FOREIGN PATENT DOCUMENTS 525,124 8/1940 United Kingdom .............. 192/18 A

Primary Examiner—Benjamin W. Wyche
Attorney, Agent, or Firm—Richards, Harris & Medlock

[57] ABSTRACT

The specification discloses a low inertia clutch and brake system which includes a rotatable shaft and high speed and low speed clutch assemblies spaced apart along the shaft. A brake assembly is disposed between the high and low clutch assemblies and includes a stationary housing enclosing friction surfaces mounted about the shaft which are normally engaged with the housing to prevent rotation of the shaft. A pair of pistons are slidably mounted in the housing and are operable in response to fluid pressure to selectively disengage the brake assembly and to engage one of the clutch assemblies. Structure is provided to selectively apply fluid pressure to either of the pistons. The pistons include spring carrying rods which extend through the housing in order to normally bias the pistons toward the housing to normally engage the brake assembly.

26 Claims, 5 Drawing Figures

LOW INERTIA CLUTCH AND BRAKE SYSTEM

FIELD OF THE INVENTION

This invention relates to clutch and brake assemblies, and more particularly relates to a low inertia clutch and brake system for use on presses, press brakes and the like.

THE PRIOR ART

A variety of different types of transmissions have been heretofore developed for use with metal forming machines such as presses and press brake systems. For example, U.S. Pat. No. 3,595,353, issued July 27, 1971 and entitled "Couplings With Stationary Spring and Fluid Motor" by Applicant and assigned to the present Assignee, discloses a single speed clutch and brake system. Duplex or back-to-back clutches mounted on a rotating press brake shaft to provide a two speed press brake system are disclosed in U.S. Pat. No. 3,498,424, issued Mar. 3, 1970 and entitled "Multiple Speed Mechanical Transmission Shift System." Such two speed systems have generally required the use of a separate drive friction brake in order to stop the rotating shaft when desired. Such prior two speed duplex systems in some instances have been subject to undesirable operation with both a clutch and brake energized.

In U.S. Pat. application Ser. No. 454,271, filed Mar. 25, 1974, and entitled "Two Speed Clutch and Brake System," a system is disclosed for a two speed clutch system in combination with a "wet" or oil lubricated brake, with structure to prevent simultaneous energization of the brake with either of the clutches. Although this system has been found to work well in practice, it has become desirable to provide a two speed clutch system having a "wet" brake which has a lower inertia and which may be packaged in a more compact housing, as well as eliminating moving parts and bearings.

SUMMARY OF THE INVENTION

In accordance with the present invention, a low inertia clutch and brake system includes a rotatable shaft. A low speed clutch assembly including friction clutch surfaces is mounted about the shaft, and is spaced from a high speed clutch assembly which also includes friction clutch surfaces mounted about the shaft. A brake assembly is disposed between the low and high clutch assemblies and includes friction surfaces mounted about the shaft. A stationary housing is disposed about the brake assembly. The brake assembly is normally engaged with the housing to prevent rotation of the shaft. Pistons are mounted in the housing and are operable in response to fluid pressure to selectively disengage the brake assembly and to engage one of the clutch assemblies. Structure is provided to selectively apply fluid pressure to either of the pistons.

In accordance with another aspect of the invention, a clutch and brake system for a press includes a rotatable shaft with low and high speed clutch assemblies spaced along the shaft. A brake assembly is disposed between the low and high clutch assemblies and is normally engaged to prevent rotation of the shaft. A pair of non-rotating integral annular pistons are provided with first surfaces disposed against opposite sides of the friction surfaces of the brake assembly for normally engaging the brake assembly. The pistons also include second surfaces disposed radially outwardly from the brake assemblies Pressurized fluid may be selectively applied to the second surfaces to move the pistons toward the clutch assemblies to disengage the brake assembly and to engage one of the clutch assemblies.

In accordance with yet another aspect of the invention, a low inertia clutch-brake assembly includes a brake located around a rotating shaft and disposed between two clutch assemblies. A pair of non-rotating annular pistons are disposed about the shaft on opposite sides of the brake. A plurality of fasteners extend between the pair of pistons and are disposed radially outwardly from the brake. Springs are provided to exert a biasing force against the fasteners to normally bias the pistons toward one another to normally engage the brake. Pressurized fluid may be admitted against a selected one of the pistons to disengage the brake and to engage one of the clutches.

In accordance with yet a more specific aspect of the invention, a clutch and brake system includes a rotatable shaft, with low and high speed clutch assemblies spaced along the shaft. A brake assembly is disposed between the low and high clutch assemblies and includes friction surfaces mounted about the shaft which are normally engaged to prevent rotation of the shaft. A stationary housing is disposed about the brake assembly and engages outer peripheries of ones of the friction surfaces. The housing includes a plurality of lateral apertures annularly spaced about the housing. First and second annular non-rotating pistons are disposed about the shaft and laterally slide in chambers in the housing. The pistons include piston surfaces disposed radially outwardly of the housing and include brake engaging surfaces for abutting the sides of the brake assembly. A first plurality of bolts are connected at one end to the first piston and extend through alternate ones of the apertures in the housing. A second plurality of bolts are connected at one end to the second piston and extend through the remaining alternate ones of the apertures in the housing. Springs are disposed about the bolts within the apertures in the housing for biasing the pistons toward one another for normally causing the brake assembly to be engaged. Pressurized fluid may be selectively directed to a selected one of the piston surfaces to move one of the pistons to engage one of the clutch assemblies and to disengage the brake assembly.

DESCRIPTION OF THE DRAWINGS

For a more complete understanding of the present invention and for other objects and advantages thereof, reference is now made to the following description taken in conjunction with the accompanying Drawings, in which.

DESCRIPTION OF THE PREFERRED EMBODIMENT

Figure 1:
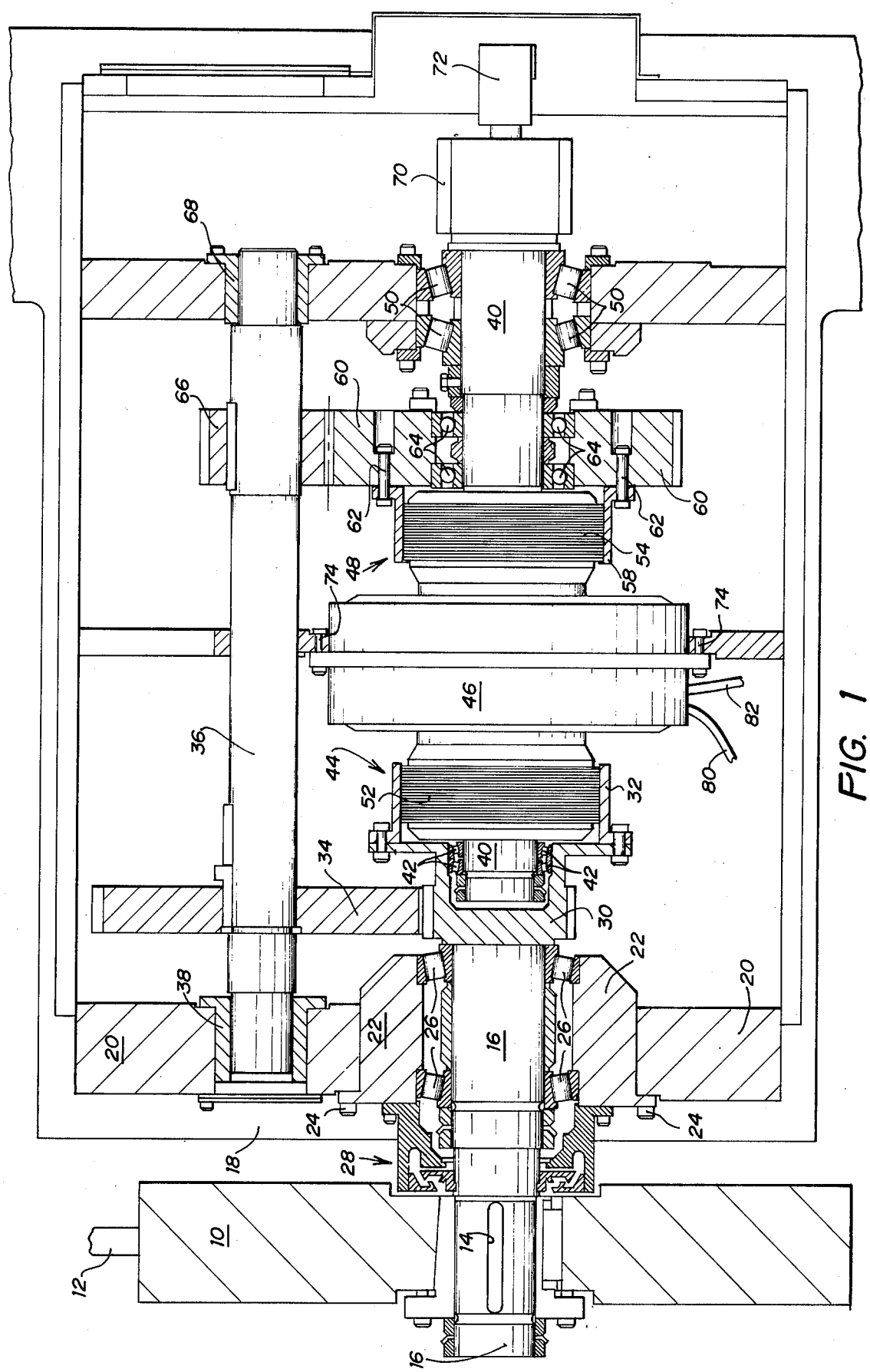
FIG. 1 is a partially sectional view of a press clutch and brake assembly utilizing the present low inertia system.

FIG. 1 illustrates a press clutch and brake system utilizing the present invention. A flywheel 10 is adapted to be rotated by a suitable belt or chain 12 which is driven by a motor not shown. Flywheel 10 is keyed at key 14 to a shaft 16. Shaft 16 extends through an opening in a housing wall 18 into the interior of the housing. A wall extension 20 extends from the housing wall 18 and a bearing support member 22 is bolted thereto by bolts 24. Shaft 16 is journaled in angled radial thrust roller bearings 26. The roller bearings are disposed in outer races attached to the frame and the bearings are angled with respect to the axis of the shaft 16 in order to prevent movement of the shaft 16 along its axis. A sealing configuration 28 is formed between the housing wall and the shaft 16 in order to prevent leakage of oil therethrough. A low speed drive pinion 30 is formed on the end of shaft 16 and includes a spider 32. Pinion 30 includes gear teeth which mesh with the teeth of a low speed gear 34 which is keyed to an intermediate shaft 36. Shaft 36 is journaled for rotation in a bearing support 38.

A shaft 40 has one end positioned within the drive pinion 30 and is rotatably supported therein by a radial thrust roller bearing 42. Shaft 40 extends through the center of a high speed clutch assembly 44, a brake housing 46 and a low speed clutch assembly 48 and is rotatably journaled in radial thrust roller bearing 50. Bearing 50 includes sets of rollers angled at opposite angles to the axis of shaft 40 to prevent lateral motion of the shaft 40 along its axis, while allowing free rotation of the shaft 40. For example, lateral movement of the shaft 40 in either direction would cause one of the sets of bearings 50 to resist the movement.

The high speed clutch assembly 44 includes a plurality of friction clutch surfaces 52, while the low speed clutch assembly 48 includes a plurality of friction clutch surfaces 54. The spider 32 engages alternate ones of the friction clutch surfaces 52, with the remaining ones of the surfaces 52 engaging the shaft 40. Similarly, alternate ones of the friction clutch surfaces 54 are engaged at their outer peripheries with a spider 58 which is attached to a gear 60 by bolts 62. Gear 60 is rotatably mounted about shaft 40 by bearings 64.

Gear 60 meshes with a gear 66 which is keyed to intermediate shaft 36. The outer end of shaft 36 is journaled for rotation in a bearing support 68. A drive pinion 70 is mounted on the end of shaft 40 in order to operate gears, not shown, for operating the bull gears of a press or press brake system in the known manner. An oil inlet 72 is connectable to a source of pressurized oil in order to provide lubrication of the system in the manner to be subsequently described in greater detail.

An important aspect of the present invention is that the brake housing 46 is stationary and is rigidly attached to the frame by bolts 74. The brake assembly is normally engaged, and thus the shaft 40 is normally prevented from movement, as the clutches 44 and 48 are disengaged when the brake assembly is engaged. A source of pressurized fluid such as oil or air may be selectively applied to the brake housing via inlets 80 or 82 in order to selectively deenergize the brake assembly and to energize either one of the clutch assemblies 44 and 48.

When a high speed operation is selected, the clutch assembly 44 is energized and the brake assembly is deenergized. Drive is then transmitted directly from the flywheel 10 through the shaft 16 and through the spider 32 and the clutch assembly 44 to operate the shaft 40 at a high speed. At the high speed, the intermediate shaft 36 is rotated, but since the clutch assembly 48 is de-energized, the gear 60 does not impart rotative motion to the shaft 40. When it is desired to rotate the system in a low speed, the brake is de-energized and the clutch assembly 48 is energized. Rotative motion is then applied from the flywheel 10 through the shaft 16 and through pinion 30 and gear 34 to rotate the shaft 36. Rotative motion is then applied through gear 66 and gear 60 to the engaged clutch assembly 48 to rotate shaft 40 at a low speed. Rotation of shaft 40 causes rotation of drive pinion 70 in order to drive the press in the well known manner.

An important aspect of the invention is that the moving parts necessary to energize the invention are maintained in the compact stationary housing 46 and thus do not impart inertia to the system. The present system is thus able to improve operating performance and efficiency of the system.

Figure 2:
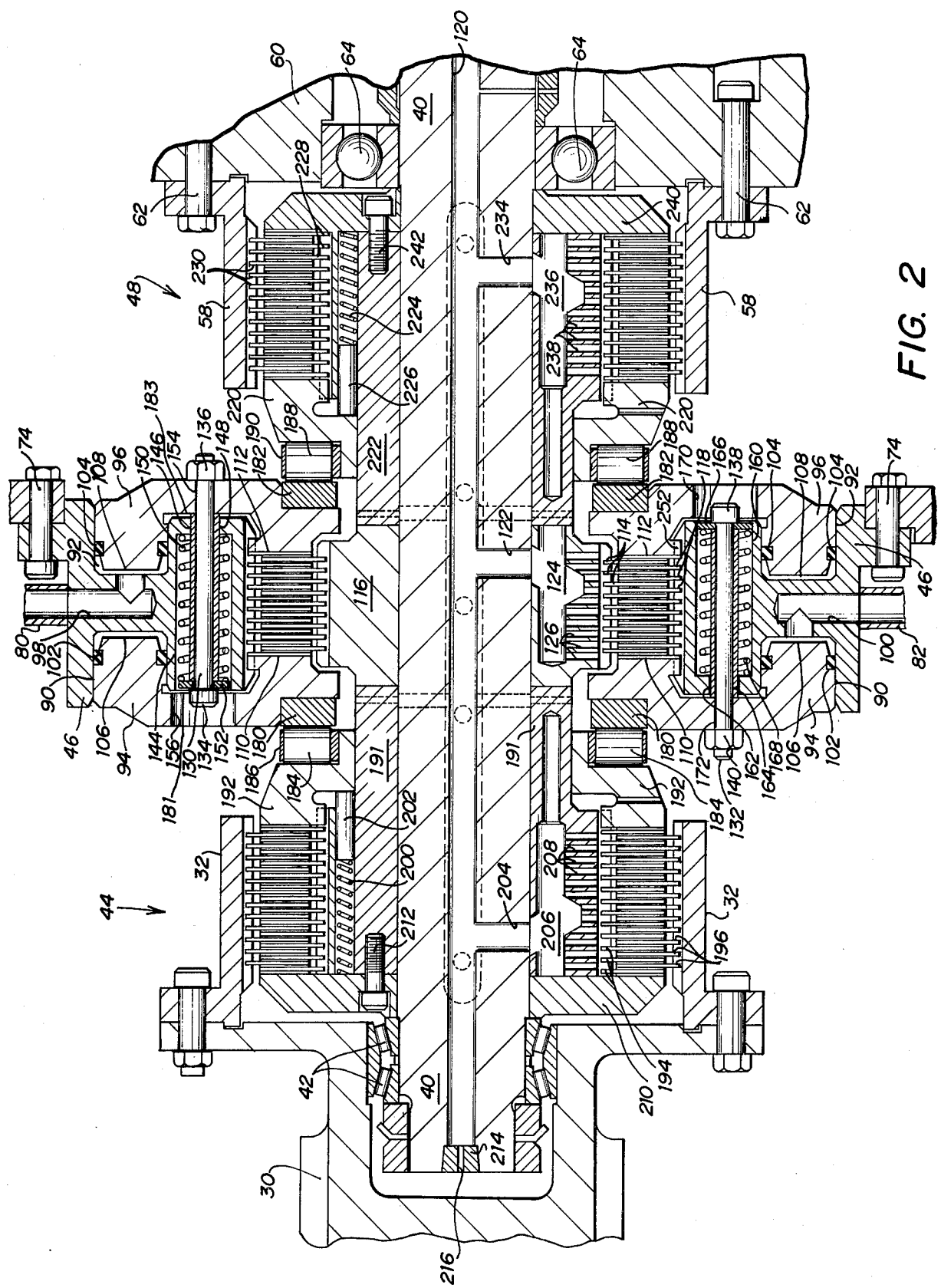
FIG. 2 is a sectional view of the present system shown in FIG. 1.

FIG. 2 is a partially sectioned drawing of the preferred clutch and brake system of the present invention, wherein like numerals are utilized for like and corresponding parts. Housing 46 may be seen to comprise annular chambers 90 and 92 formed in the sides thereof for receiving annular pistons 94 and 96 respectively. Pistons 94 and 96 are splined to the housing 46 to prevent relative rotation between the pistons and the housing. Pressurized fluid may be applied to chamber 92 through the inlet 80 and through an aperture 98 formed through housing 46. Pressurized fluid may be applied to chamber 90 via the inlet 82 and through an aperture 100 formed through the end of housing 46 in the manner illustrated. In this manner, pistons 94 and 96 may be selectively forced laterally away from the housing 46 in order to selectively energize one of the clutch assemblies 44 or 48.

Seals 102 and 104 are placed between the chambers 90 and 92 and the pistons 94 and 96. Each of the pistons have piston surfaces 106 and 108, respectively, for receiving the force exerted by the pressurized fluid. An important aspect of the present invention is that the piston surfaces 106 and 108 are disposed radially outwardly from the brake assembly. This allows the use of the thin, diametrically large brake assembly housing. Such a construction was not possible in prior systems wherein the pistons rotated with the shaft, due to the increased inertia resulting from such a configuration.

Piston 94 includes a brake engaging surface 110 which is adapted to bear against the side of the brake assembly. Similarly, piston 96 includes a brake engaging surface 112 for engaging the opposite side of the brake assembly. The brake assembly includes a plurality of friction clutch surfaces annularly disposed about the shaft 40. A first set of friction brake surfaces 114 are engaged by teeth about a brake hub 116 which is keyed to the shaft 40. The brake assembly includes a second set of friction surfaces 118 which are keyed at the outer periphery to teeth about the stationary brake housing 46.

The friction brake surfaces 114 and 118 are alternatingly spaced adjacent to one another in the manner illustrated. Thus, when the pistons 94 and 96 are in their inward position, the brake engaging surfaces 110 and 112 cause the two sets of friction brake surfaces 114 and 118 to be engaged to thereby stop rotation of the shaft 40. Lubricating oil is applied through the shaft 40 through a passageway 120 through the center thereof. Oil is applied through a passage 122 to a passage 124 in the brake hub. A plurality of small oil passages 126 are defined through the brake hub in order to supply the brake assembly with lubricating oil. The brake assembly friction surfaces are thus of the "wet disk" type.

Another important aspect of the present invention is a first set of eight bolts 130 mounted at spaced points about piston 96 and a second set of eight bolts 132 disposed about piston 94. The bolts 130 and 132 are spaced at alternate points about the housing 46 and extend through apertures formed in the housing 46 in the manner to be shown in FIG. 4. Each of the bolts 130 include a socket head 134 and the bolts are attached to the pistons 96 by nuts 136. Similarly, each of the bolts 132 includes a socket head 138 and are attached by nuts 140 to piston 94.

Circular chambers 144 are defined in the housing 46 to accommodate each of the bolts 130. The chambers 144 are formed as a counterbore, with a smaller dimension aperture 146 extending through one side of the housing 46 into the counterbore to accommodate the passage of the bolt 130 and a spacer 148 which surrounds the bolt. A spring 150 is disposed about each of the bolts 130. A spring washer 152 is fixed adjacent the socket head 134, in order to abut one end of the spring 150. Spring 150 is thus compressed between the end of chamber 144 in housing 46 and the spring washer 152 in order to normally urge the piston 96 into engagement with the brake assembly. An aperture 154 is defined through piston 96 to accommodate the bolt 130. An aperture 156 is disposed through piston 94 in order to accommodate the socket head 134 of the bolt 130.

In a similar manner, chamber 160 is defined by a counterbore through the housing 46. Circular chambers 144 and 160 are formed from opposite sides of the housing 46. A smaller diameter aperture 162 opens from the bottom of the chamber 160 to accommodate the bolt 132 and the accompanying sleeve 164. A spring washer 166 is attached to the socket head 138 of the bolt 132. A spring 168 is biased between the washer 166 and the bottom of the chamber 160 in order to bias the piston 94 normally against the brake assembly. An aperture 170 is formed in piston 96 to accommodate the socket head 138, while an aperture 172 is formed through piston 94 to allow passage therethrough of the bolt 132.

The bolt and spring arrangement thus illustrated serve to maintain the brake assembly normally engaged. An important aspect of the invention is that the bolts 130 and 132 and their associated springs are disposed radially outwardly from the brake assembly and thus save substantial lateral space, without imparting inertia to the system, inasmuch as they are stationary.

An annular washer 180 is pressed into piston 94, while a similar annular washer 182 is pressed in adjacent piston 96. Surfaces 181 and 183 of the pistons 94 and 96 abut against the housing 46 to prevent excessive lateral movement of the pistons toward the brake friction surfaces. A plurality of circular roller thrust bearings 184 are disposed about an annular cage 186 and are disposed adjacent washers 180. Similarly, a plurality of roller thrust bearings 188 are disposed in a cage 190 disposed adjacent washer 182. The thrust bearings 184 bear against clutch pusher plate 192 which is annularly disposed about shaft 40 and which is keyed for rotation with the clutch hub 191 which is keyed to shaft 40. The clutch pusher plate 192 bears against friction clutch surfaces 194 which are keyed for rotation with the clutch hub 191. A second set of friction clutch surfaces 196 are keyed at their outer peripheries to spider 32.

Clutch surfaces 194 and 196 normally rotate relative to one another. However, when piston 94 is moved axially outwardly by pressurized fluid from the housing 46, the clutch pusher plate 192 engages the friction clutch surfaces 194 and 196 in order to energize the high speed clutch in the manner previously described with respect to FIG. 1. A spring 200 is disposed adjacent a plunger 202 which normally exerts a small force against the clutch pusher plate 192 toward the housing 46 in order to prevent the roller thrust bearings 184 from slipping out of their cage.

Oil is provided to the high speed clutch 44 through a passageway 204 to a passageway 206 in the clutch hub 191. A plurality of oil apertures 208 communicate between the passageway 206 and the clutch surfaces 194 and 196 for lubrication thereof. An end plate 210 is bolted onto the clutch hub 191 by socket head cap screws 212. A plug 214 is disposed at the end of passageway 120, along with an orifice 216 to allow the desired amount of oil to pass for lubrication of bearings 42.

In a similar manner, a clutch pusher plate 220 is keyed to a low speed clutch hub 222 which is keyed for rotation with shaft 40. The clutch pusher plate 220 bears against the thrust bearings 188, and a spring 224 and a plunger 226 operate to prevent the bearings 188 from slipping from the cage 190. The low speed clutch includes a first set of friction clutch surfaces 228 which are keyed at their inner peripheries to the low speed clutch hub 222, and a second set of friction clutch surfaces 230 which are keyed at their outer peripheries to the spider 58. When piston 96 moves outwardly from housing 46, the clutch pusher plate 220 is moved against the friction clutch surfaces 228 and 230 in order to engage the low speed clutch in the manner previously described.

Lubricating oil is supplied through passageway 234 to a passageway 236 in the clutch hub 222. Apertures 238 are formed through the clutch hub 222 in order to provide oil to the friction clutch surfaces 228 and 230. An end plate 240 is rigidly attached to the clutch hub 222 by socket head cap screws 242. Lubricating oil is also supplied to bearings 184 and 188 through apertures extending radially from passageway 120.

Figure 3:
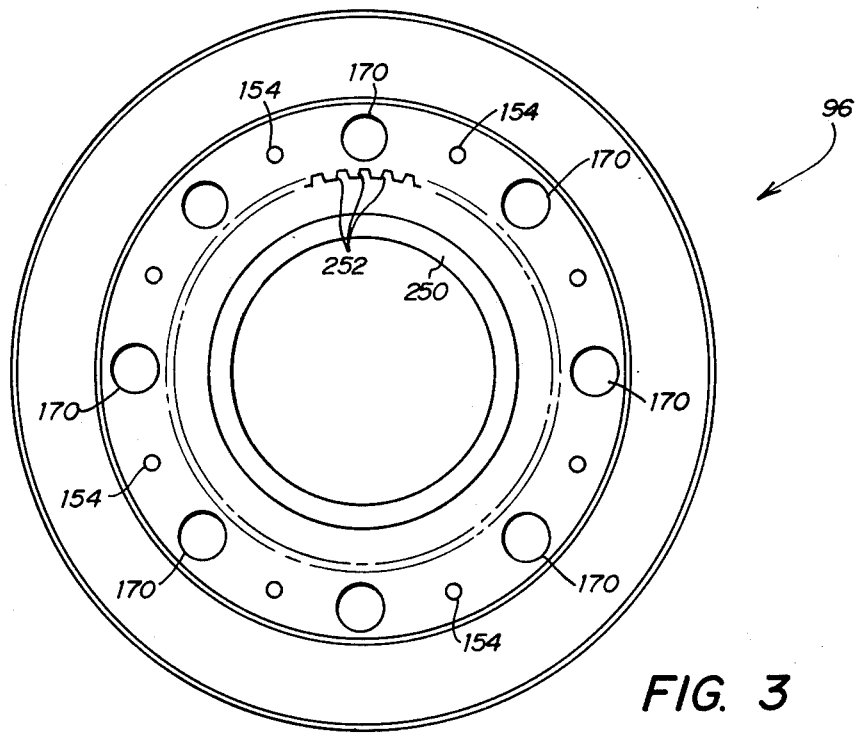
FIG. 3 is a side view of one of the annular pistons of the invention.

FIG. 3 illustrates a side view of piston 96. It will be understood that pistons 94 and 96 are identically constructed. An aperture 250 is formed through the piston 96 for accommodating the brake hub 116 which is keyed to shaft 40. A plurality of teeth 252 are formed about the piston 96 for being splined with mating teeth from the housing 46 in order to prevent any rotation of the piston. Eight large apertures 170 are spaced about the periphery of the pistons for receiving the heads 138 of the bolts 132. Eight small apertures 154 are defined through the pistons for receiving the bolts 130. FIG. 3 thus illustrates how the bolts 130 and 132 are alternatingly disposed about the peripheries of the pistons 94 and 96.

Figure 4:
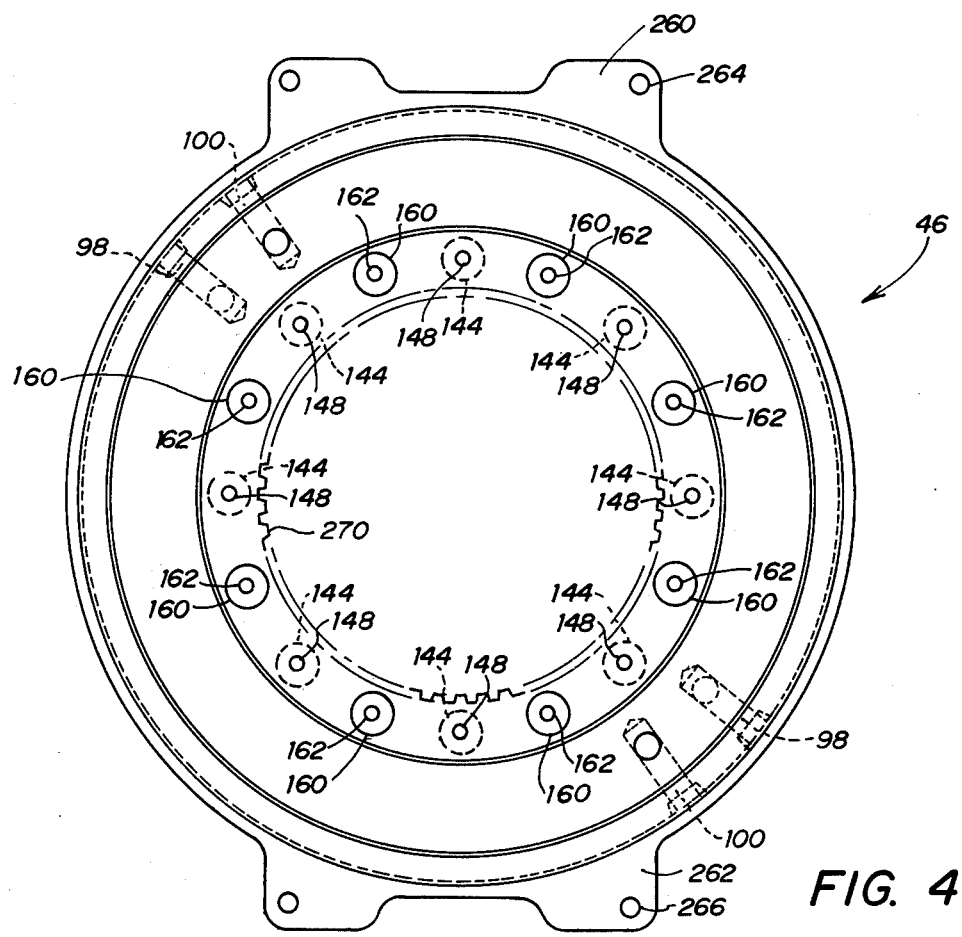
FIG. 4 is a side view of the stationary housing of the invention.

FIG. 4 illustrates a side view of the brake housing 46. Flanges 260 and 262 extend from the top and bottom of the housing 46 and include apertures 264 and 266 for receiving bolts 74 for attachment to the main frame. A pair of apertures 98 and a pair of apertures 100 are formed through the housing for communication with annular chamber 92 and with annular chamber 90, not shown in FIG. 4. As previously noted, piston 96 is slidably received within the annular chamber 92 of housing 46. Teeth 270 are formed about the inner periphery of the housing 46 for engagement with the outer peripheries of the brake friction surfaces 118. Eight chambers 160 are formed at spaced intervals about housing 46 for defining the counterbore chambers for receiving the spring 168. Apertures 162 are formed through the housing for receiving the bolts 132 and their associated sleeves 164.

In a similar manner, eight circular chambers 144 are disposed on the opposite side of the housing 46 at spaced intervals about the housing. Apertures 144 are provided to receive the bolts 130 and their associated spacer sleeves. FIGS. 3 and 4 thus illustrate that the bolts 130 and 132 are equally spaced in an alternating manner about the housing 46 to provide an equal force to energize the brake or to enable the energization of the clutch surfaces.

Figure 5:
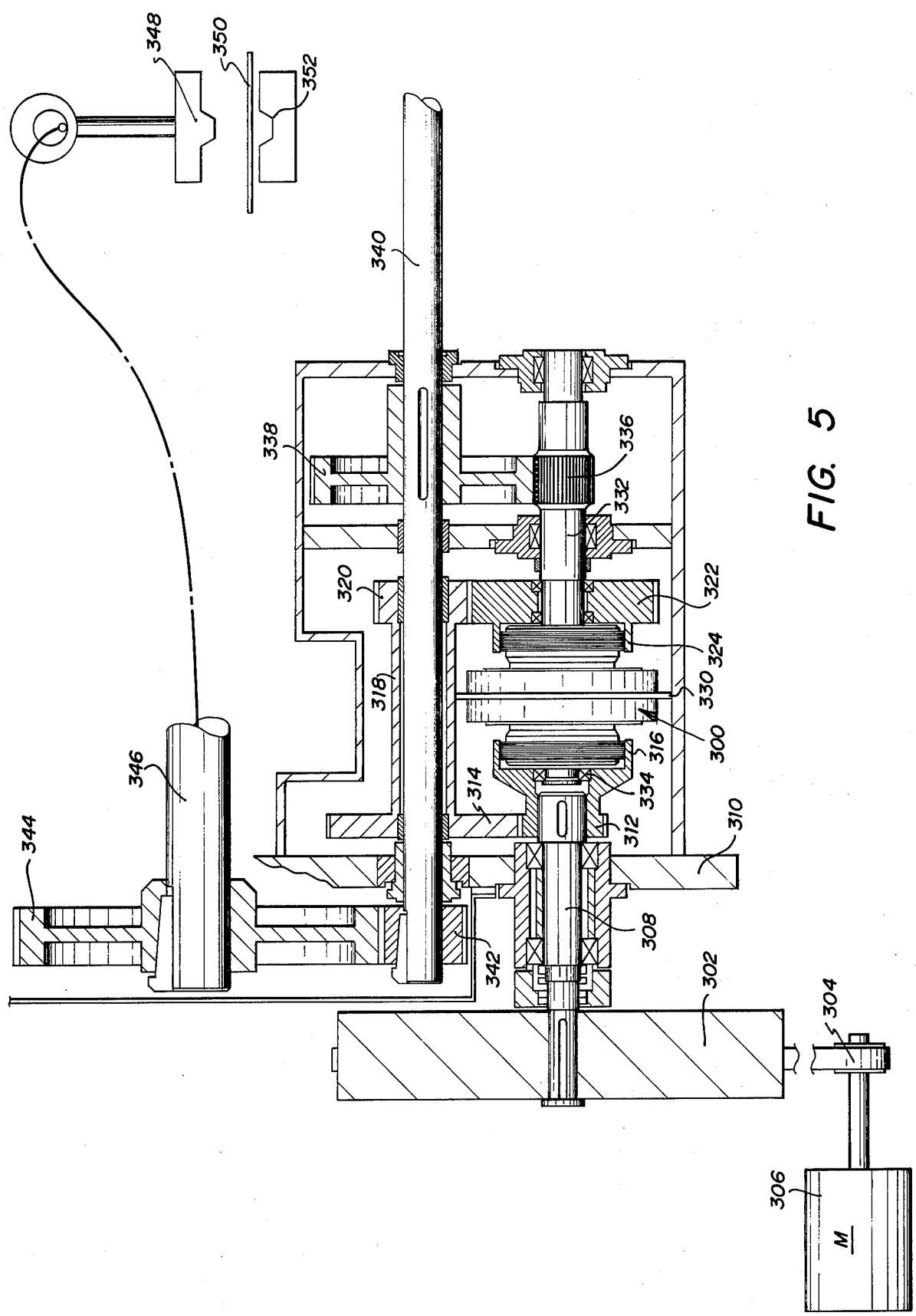
FIG. 5 is a partially sectioned view of another press system utilizing the present invention.

It will be understood that the present clutch and brake system may be utilized in other systems. FIG. 5 illustrates the use of the present system identified generally by the numeral 300 in a different press system. This system includes a flywheel 302 which is driven by a belt or chain 304 by a suitable motor 306. The flywheel 302 turns a shaft 308 which extends through a housing 310. A pinion 312 meshes with a gear 314 and includes a spider 316 which engages the high speed clutch surfaces of the present invention. Gear 314 is rigidly connected through a sleeve 318 to a gear 320. Gear 320 meshes with a gear 322 which includes a spider 324 which engages the low speed clutch surfaces of the invention as previously described. The brake housing of the present invention is rigidly attached by flange 330 to the housing as previously described.

A second shaft 332 extends through the present system 300 and is journaled at 334 in the manner previously described. Shaft 332 includes a gear 336 which meshes with a gear 338. Gear 338 is keyed to an intermediate shaft 340 which extends through the sleeve 318 and gears 314 and 320. The end of shaft 340 is keyed to a gear 342 which meshes with a bull gear 344 which drives a drive shaft 346. Drive shaft 346 operates to eccentrically drive a ram 348 in order to bend a metal piece 350 in a mold 352 in the well known manner.

In ddition to the various systems shown in FIGS. 1 and 5 of the invention, it will be understood that the present brake and clutch system may also be utilized on a number of different types of other machines. The present system provides a very low inertia clutch and brake system, due to the fact that very few parts are required to rotate with the shaft. The interconnecting bolts and springs of the invention are interlaced in order to save space and weight. Due to the low inertia of the present system, the system provides improved operating performance.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A low inertia clutch and brake system comprising:
   a rotatable shaft,
   a low speed clutch assembly including friction clutch surfaces mounted about said shaft,
   a high speed clutch assembly including friction clutch surfaces mounted about said shaft and spaced from said low speed clutch assembly,
   a brake assembly disposed between said low and high speed clutch assemblies and including friction surfaces mounted about said shaft, said brake assembly normally engaged to prevent rotation of said shaft,
   a stationary housing disposed about said brake assembly,
   piston means mounted in said housing and operable in response to fluid pressure to selectively disengage said brake assembly and to engage one of said clutch assemblies,
   spring biased means associated with each of said piston means being disposed radially outwardly of said brake assembly for normally urging said piston means toward said brake assembly to normally engage said brake assembly, and
   means for selectively applying fluid pressure to said piston means in order to disengage said brake assembly and to engage one of said clutch assemblies.

2. The clutch and brake system of claim 1 wherein piston means extend radially outwardly of said brake assembly.

3. A clutch and brake system for a press comprising:
   a rotatable shaft,
   a low speed clutch assembly including friction clutch surfaces mounted about said shaft,
   a high speed clutch assembly including friction clutch surfaces mounted about said shaft and spaced from said low speed clutch assembly,
   a brake assembly disposed between said low and high speed clutch assemblies and including friction surfaces mounted about said shaft, said brake assembly normally engaged to prevent rotation of said shaft,
   a pair of nonrotating integral annular pistons having first surfaces disposed against opposed sides of said friction surfaces of said brake assembly for normally engaging said brake assembly to prevent rotation of said shaft, said pistons also having second surfaces disposed radially outwardly from said brake assembly,
   spring biased rods associated with each of said pistons being disposed radially outwardly of said brake assembly for normally urging said piston toward said brake assembly, and
   means for applying pressurized fluid against said second surfaces to move said pistons toward said clutch assemblies to disengage said brake assembly and to engage one of said clutch assemblies.

4. The clutch and brake system of claim 3 wherein said rods comprise first and second sets each associated with one of said pistons and alternatingly disposed annularly about said housing.

5. The clutch and brake system of claim 3 and further comprising:
   annular chambers for slidably receiving said pistons, said applying means comprising apertures formed through said housing and communicating with said chambers for supplying pressurized fluid thereto.

6. The clutch and brake system of claim 3 and further comprising:
   angled roller bearings disposed adjacent the end portion of said shaft to inhibit movement of said shaft along its axis.

7. In a low inertia clutch-brake assembly wherein a brake is located around a rotating shaft and is disposed between two clutch assemblies, the combination comprising:
   a pair of nonrotating annular pistons disposed about said shaft on opposite sides of the brake,
   a plurality of fastening means extending between said pair of pistons and disposed radially outwardly from said brake,
   springs for exerting a biasing force against said fastening means to normally bias said pistons toward one another to normally engage the brake, and means for admitting pressurized fluid against a selected one of said pistons to disengage the brake and to engage one of the clutches.

8. The combination of claim 7 and further comprising: a stationary housing containing said pistons and fastening means.

9. The combination of claim 8 wherein said fastening means are annularly disposed around said shaft, alternate ones of said fastening means connected to alternate ones of said pistons.

10. The combination of claim 8 wherein said fastening means comprise:
bolts connected to said pistons and extending through said housing, said springs surrounding said bolts and biased between said housing and said bolts.

11. The combination of claim 10 and further comprising:
apertures formed through said housing and having large diameter counterbore portions for accommodating said springs, abutment means on the ends of said bolts, said springs biased between the end of said counterbore portions and said abutment means to bias said pistons toward said housing.

12. A clutch and brake system comprising:
a rotatable shaft,
a low speed clutch assembly including friction clutch surfaces mounted about said shaft,
a high speed clutch assembly including friction clutch surfaces mounted about said shaft and spaced from said low speed clutch assembly,
a brake assembly disposed between said low and high speed clutch assemblies and including friction surfaces mounted about said shaft, said brake assembly normally engaged to prevent rotation of said shaft,
a stationary housing encircling said brake assembly,
first and second integral annular pistons laterally slidable in opposite sides of said housing and having piston surfaces disposed radially outwardly of said brake assembly,
said pistons also having brake engaging surfaces normally bearing against the sides of said brake assembly,
said pistons also including clutch actuating surfaces for causing engagement of said clutch assemblies,
means in said housing for selectively directing pressurized fluid against said piston surfaces to move said pistons laterally away from said housing for disengaging said brake assembly and for engaging a selected one of said clutch assemblies,
a first set of bolts connected at one end to said first piston and extending into said housing,
a second set of bolts connected at a second end to said second piston and extending into said housing,
said first and second set of bolts alternatingly positioned circumferentially about said housing, and
springs disposed about each of said bolts for biasing said pistons toward said housing.

13. The clutch and brake system of claim 12 wherein a first end of said bolts extends through one of said pistons and is connected thereto to a nut to prevent withdrawal therefrom.

14. The clutch and brake system of claim 13 wherein a second set of each of said bolts abuts with one end of said spring associated therewith, the opposite end of said spring abutting with a surface of said housing.

15. The clutch and brake system of claim 12 wherein said means in said housing for directing fluid is disposed radially outwardly of said brake assembly.

16. A clutch and brake system comprising:
a rotatable shaft,
a low speed clutch assembly including friction clutch surfaces mounted about said shaft,
a high speed clutch assembly including friction clutch surfaces mounted about said shaft and spaced from said low speed clutch assembly,
a brake assembly disposed between said low and high speed clutch assemblies and including friction surfaces mounted about said shaft, said brake assembly normally engaged to prevent rotation of said shaft,
a stationary housing disposed about said brake assembly and engaging outer peripheries of ones of said friction surfaces, said housing having a plurality of lateral apertures annularly spaced around said housing,
first and second annular nonrotating pistons disposed about said shaft and laterally slidable in said housing,
said pistons having piston surfaces disposed radially outward of said housing and having brake engaging surfaces for abutting the sides of said brake assembly,
a first plurality of bolts connected at one end to said first piston and extending through alternate ones of said apertures in said housing,
a second plurality of bolts connected at one end to said second piston and extending through the remaining alternate ones of said apertures in said housing, springs disposed about said bolts within said apertures in said housing for biasing said pistons toward one another for normally causing said brake assembly to be engaged, and
means in said housing for directing pressurized fluid to a selected one of said piston surfaces to move one of said pistons to engage one of said clutch assemblies and to disengage said brake assembly.

17. The clutch and brake system of claim 16 and further comprising:
clutch engaging surfaces on said pistons,
clutch pusher rings disposed adjacent each of said clutch assemblies,
bearing means disposed between said clutch engaging surfaces and said clutch pusher rings.

18. The clutch and brake system of claim 16 wherein said means for directing fluid comprises:
apertures formed in said housing radially outwardly of said brake assembly.

19. The clutch and brake system of claim 16 wherein each of said pistons include circumferentially disposed apertures.

20. The clutch and brake system of claim 19 wherein adjacent ones of said apertures have different diameters.

21. The clutch and brake system of claim 16 and further comprising:
a pair of adjacent roller bearings angled relative to the axis of said shaft and connected near the end portion of said shaft to prevent movement of said shaft along the axis thereof.

22. The clutch and brake system of claim 16 wherein said bolts are connected to said pistons between said piston surfaces and said brake engaging surfaces.

23. The clutch and brake system of claim 16 and further comprising:
chambers formed on opposite sides of said housing for receiving said pistons, said means for directing fluid comprising apertures formed in said housing for communicating with said chamber.

24. The clutch and brake system of claim 16 and further comprising:
clutch pusher plates disposed between each of said clutch assemblies and said pistons, and
a bearing cage having roller thrust bearings disposed between each of said clutch pusher plates and said pistons.

25. The clutch and brake system of claim 24 and further comprising:
means for normally biasing said clutch pusher plates toward said cages to prevent said roller thrust bearings from slipping from said bearing cage.

26. The clutch and brake system of claim 25 wherein said means for biasing comprises:
a spring and a plunger.

* * * * *